(12) United States Patent
Yang

(10) Patent No.: US 10,565,590 B2
(45) Date of Patent: Feb. 18, 2020

(54) DATA PROCESSING METHOD BASED ON INSTANT MESSAGING OR SOCIAL APPLICATIONS, AND DEVICE THEREOF

(71) Applicant: TENCENT TECHNOLOGY (SHENZHEN) COMPANY LIMITED, Shenzhen (CN)

(72) Inventor: Lin Yang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 680 days.

(21) Appl. No.: 15/142,310

(22) Filed: Apr. 29, 2016

(65) Prior Publication Data

US 2016/0247157 A1   Aug. 25, 2016

Related U.S. Application Data

(63) Continuation of application No. PCT/CN2014/093814, filed on Dec. 15, 2014.

(30) Foreign Application Priority Data

Dec. 31, 2013   (CN) .......................... 2013 1 0754460

(51) Int. Cl.
*G06Q 20/40* (2012.01)
*H04L 12/58* (2006.01)
*G06Q 50/00* (2012.01)

(52) U.S. Cl.
CPC ......... *G06Q 20/4014* (2013.01); *G06Q 50/01* (2013.01); *H04L 51/04* (2013.01); *H04L 51/16* (2013.01); *H04L 51/32* (2013.01)

(58) Field of Classification Search
CPC .... G06Q 50/01; G06Q 20/4014; G06Q 50/04; H04L 51/04; H04L 51/00; H04L 51/32; H04L 51/16
See application file for complete search history.

(56) References Cited

U.S. PATENT DOCUMENTS 8,751,319 B2 * 6/2014 Silverstein ............. G06Q 20/04
705/26.1
9,779,434 B2 * 10/2017 Tonnison ............... G06Q 30/02
(Continued)

FOREIGN PATENT DOCUMENTS

| CN | 101127110 A | 2/2008 |
|----|-------------|--------|
| CN | 101350088 A | 1/2009 |

(Continued)

OTHER PUBLICATIONS

Mershon, Phil: 5 Social Media Tips for Finding and Engaging Your Target Audience: New Research, Mar. 28, 2012, Social Media Marketing World, pp. 1-19. (Year: 2012).*

(Continued)

*Primary Examiner* — Bijendra K Shrestha
(74) *Attorney, Agent, or Firm* — Morgan, Lewis & Bockius LLP

(57) ABSTRACT

A data processing method is implemented in a system including a processor. The system receives a request for transferring amount from an initiating user client, where the request includes an initiating user identification and target information. The system obtains a target user identification and an allotted amount of the target user identification based on the received request, wherein the allotted amount is smaller than or equal to a total amount corresponding to the target information. The system encapsulates the target information and the allotted amount in a dialog message, and sending the dialog message to a message window of a target user client corresponding to the target user identification.

(Continued)

The system receives a confirmation request from the target user for confirming the dialog message on the message window of the target user client, then subtracts a corresponding amount from a first account and adds the corresponding amount to a second account.

14 Claims, 6 Drawing Sheets

(56) References Cited

U.S. PATENT DOCUMENTS

| | | | | |
|---|---|---|---|---|
| 2005/0096997 A1* | 5/2005 | Jain | ............ | G06Q 30/02 705/26.1 |
| 2005/0249238 A1* | 11/2005 | Haumont | ............ | H04L 67/14 370/466 |
| 2007/0255652 A1* | 11/2007 | Tumminaro | ............ | G06Q 20/10 705/39 |
| 2008/0177659 A1* | 7/2008 | Lacey | ............ | G06Q 20/108 705/42 |
| 2010/0279668 A1* | 11/2010 | Cao | ............ | H04N 7/17318 455/414.1 |
| 2012/0185355 A1* | 7/2012 | Kilroy | ............ | G06Q 30/0633 705/26.8 |
| 2012/0271712 A1* | 10/2012 | Katzin | ............ | G06Q 30/06 705/14.51 |
| 2013/0226688 A1* | 8/2013 | Harvilicz | ............ | G06Q 30/02 705/14.39 |
| 2014/0279543 A1* | 9/2014 | Ruhrig | ............ | G06Q 50/01 705/44 |
| 2017/0132690 A1* | 5/2017 | Todd | ............ | G06Q 30/0601 |

FOREIGN PATENT DOCUMENTS

| | | | | |
|---|---|---|---|---|
| CN | 101527019 A | 9/2009 | | |
| CN | 101729435 A | 6/2010 | | |
| CN | 103020826 A | 4/2013 | | |
| CN | 103123706 A | 5/2013 | | |
| KR | 10-20080009358 A | 1/2008 | | |
| KR | 10-20080108549 A | 12/2008 | | |
| WO | WO-2011097624 A2 * | 8/2011 | ......... | G06Q 30/0242 |
| WO | WO-2012009832 A1 * | 1/2012 | ......... | G06Q 30/0269 |

OTHER PUBLICATIONS

Hwang et al.: A Study of Micro-payment Based on One-Way Hash Chain, Mar. 2006, International Journal of Network Security, vol. 2, No. 2, pp. 81-90. (Year: 2006).*
Motoyama et al.: CrossTalk: Scalably Interconnecting Instant Messaging Networks, Aug. 17, 2009, WOSN'09, Barlelona, Spain, ACM, pp. 61-66 (Year: 2009).*
Korean Office Action dated Sep. 19, 2017.
International Search Report dated Mar. 13, 2015.
Chinese Office Action dated May 24, 2016.
Tencent Technology, Written Opinion, PCT/CN2014/093814, dated Mar. 13, 2015, 4 pgs.
Tencent Technology, IPRP, PCT/CN2014/093814, Jul. 5, 2016, 5 pgs.

* cited by examiner

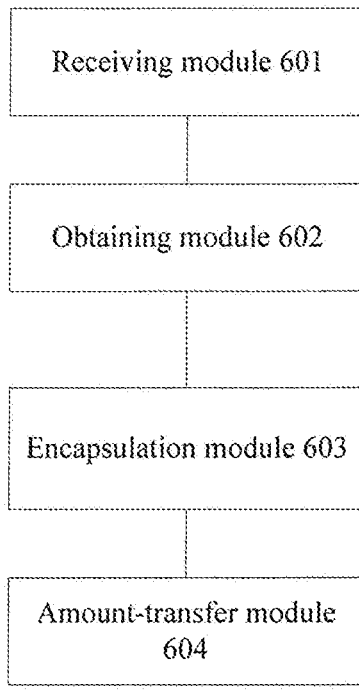

Fig. 5 when a target user client receiving a dialog message of transferring amount, displaying the dialog message in a message window, and the dialog message including target information and an allotted amount for a target user in a total amount corresponding to the target information ⟵ 701 when detecting a trigger operation to the dialog message, a trigger server calling a first account corresponding to or associated with the target user and a second account corresponding to the target information, and subtracting a corresponding amount equal to the allotted amount from the first account and then adding the corresponding amount to the second account ⟵ 702

Fig. 6

DATA PROCESSING METHOD BASED ON INSTANT MESSAGING OR SOCIAL APPLICATIONS, AND DEVICE THEREOF

CROSS-REFERENCE TO RELATED APPLICATIONS

This application is a continuation of International Application No. PCT/CN2014/093814, filed on Dec. 15, 2014, which claims priority to Chinese Patent Application No. 201310754460.9, filed on Dec. 31, 2013, the contents each of which are hereby incorporated by reference in their entirety.

FIELD

The present disclosure relates to network technology field, and more particularly to a data processing method based on instant messaging or social applications and a device thereof.

BACKGROUND

As the development of the network technology, online trading becomes more and more popular, and a payment scene for transferring amount is inevitable during the online trading. For example, service providers offer a certain service or resource which may be bought and paid by users with real or virtual money in their individual accounts, or exchanged by using points.

As diversification of the payment scenes developed, paying for another becomes a new payment manner. After a payment requester selects a commodity to be paid, a target information page for the commodity information is built, and then transferred by URL (Uniform/Universal Resource Locator), so that a payer could carry out a payment by clicking the URL to enter the target information page.

During the conventional process of paying for another, the URL used for transferring is easy to be juggled, and a same commodity name could be used in different URLs, therefore it's difficult for payers to distinguish if the URL is pointed to the true target information for the commodity to be paid, which causes security of the payment is low, so that security of the user's account could not be ensured.

SUMMARY

To solve issues of the prior art, the present disclosure provides a data processing method based on instant messaging or social application and a device thereof.

In a first aspect of the present disclosure, a data processing method includes: receiving, by a messaging system comprising a processor, a request for transferring amount from an initiating user client, the request comprising an initiating user identification and target information; obtaining, by the messaging system, a target user identification and an allotted amount of the target user identification based on the received request, wherein the allotted amount is smaller than or equal to a total amount corresponding to the target information; encapsulating, by the messaging system, the target information and the allotted amount in a dialog message, and sending the dialog message to a message window of a target user client corresponding to the target user identification; and receiving, by the messaging system, a confirmation request from the target user for confirming the dialog message on the message window of the target user client, then identifying a first account corresponding to with the target user to initiate an amount-transfer operation, and subtracting a corresponding amount from the first account and then adding the corresponding amount to a second account corresponding to the target information.

In a second aspect of the present disclosure, a data processing method includes: receiving, by a target user client, a dialog message of transferring amount; displaying, by the target user client, the dialog message in a message window, wherein the dialog message comprises target information and an allotted amount for a target user in a total amount corresponding to the target information; detecting, by the target user client, a trigger operation to the dialog message; and sending, by the target user client, a confirmation to a server so that the server subtracts a corresponding amount equal to the allotted amount from a first account and then adds the corresponding amount to a second account.

In a third aspect of the present disclosure, a data processing device includes a processor and a non-transitory storage medium accessible to the processor. The non-transitory storage medium stores modules including: a receiving module, configured to receive a request for transferring amount from an initiating user client, the request comprising an initiating user identification and target information; an obtaining module, configured to obtain a target user identification and an allotted amount of the target user identification based on the received request, wherein the allotted amount is smaller than or equal to a total amount corresponding to the target information; an encapsulation module, configured to encapsulate the target information and the allotted amount in a dialog message, and sending the dialog message to a message window of a target user client corresponding to the target user identification; and an amount-transfer module, configured to receive a confirmation request from the target user for confirming the dialog message on the message window of the target user client, identify a first account corresponding to the target user to initiate an amount-transfer operation, and subtract a corresponding amount from the first account and adding the corresponding amount to a second account corresponding to the target information.

In a fourth aspect of the present disclosure, a data processing device includes a processor and a non-transitory storage medium accessible to the processor. The non-transitory storage medium stores modules including: a display module, configured to receive a dialog message of transferring amount and display the dialog message in a message window, wherein the dialog message comprises target information and an allotted amount for a target user in a total amount corresponding to the target information; and a trigger module configured to detect a trigger operation to the dialog message and send a confirmation to a server causing the server subtracts a corresponding amount equal to the allotted amount from a first account corresponding to the target user and then adding the corresponding amount to a second account corresponding to the target information.

In comparison with the prior art, the methods and the devices of the present disclosure perform the amount-transfer operation for the target information based on instant messaging client or social applications. Since the message in the instant messaging or social applications are difficult to be juggled, which avoids security vulnerability when using URL transferring, thereby improving security of the amount-transfer operation and improving security of the user's account finally.

BRIEF DESCRIPTION OF THE DRAWINGS

To explain the technical solutions of the embodiments of the present disclosure, accompanying drawings used in the embodiments are followed. Apparently, the following drawings merely illustrate some embodiments of the disclosure, but for persons skilled in the art, other drawings can be obtained without creative works according to these drawings.

FIG. 5 is a schematic view of a data processing device based on instant messaging or social applications according to embodiments of the present disclosure;

FIG. 6 is a flowchart of a data processing method based on instant messaging or social applications according to embodiments of the present disclosure.

DETAILED DESCRIPTION OF THE DRAWINGS

Figure 1:
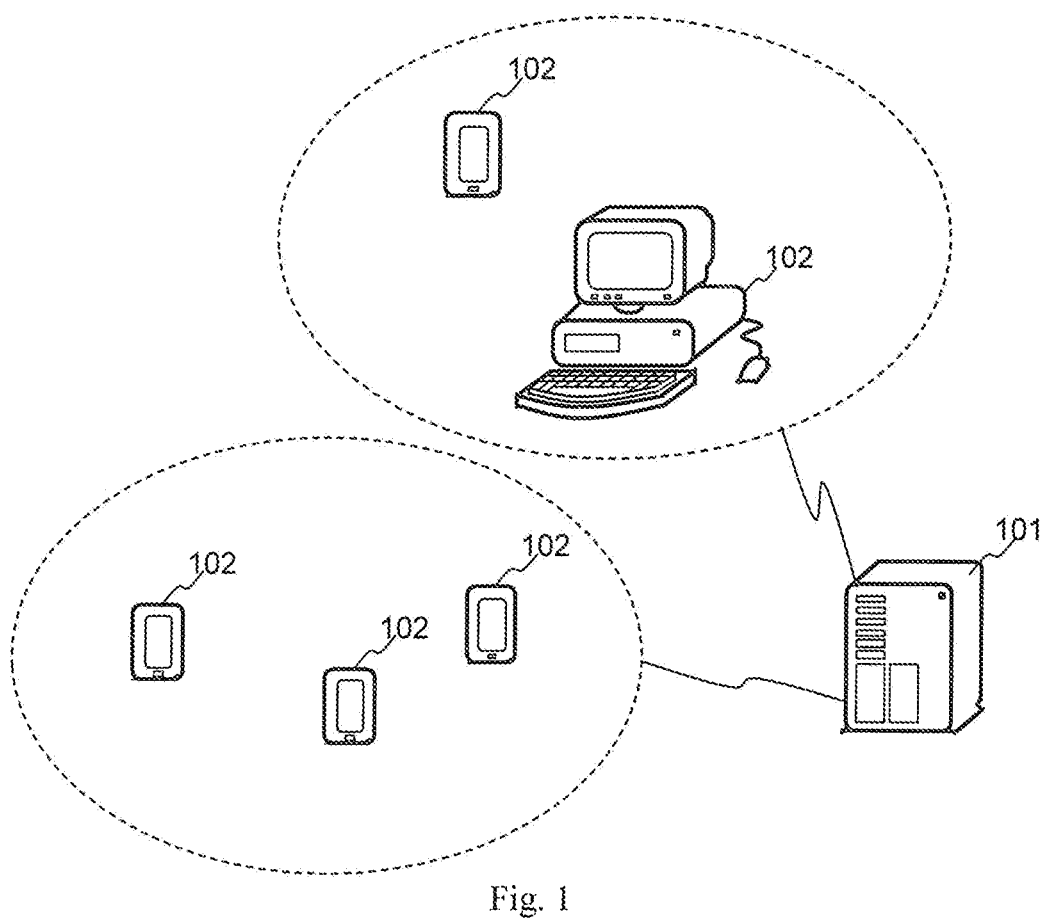
FIG. 1 is a block diagram of a data processing system based on instant messaging or social applications according to embodiments of the present disclosure.

Reference throughout this specification to "embodiments," "an embodiment," "example embodiment," or the like in the singular or plural means that one or more particular features, structures, or characteristics described in connection with an embodiment is included in at least embodiments of the present disclosure. Thus, the appearances of the phrases "in embodiments" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

The solutions in the embodiments of the present disclosure are clearly and completely described in combination with the attached drawings in the embodiments of the present disclosure. Obviously, the described embodiments are only a part, but not all, of the embodiments of the present disclosure. On the basis of the embodiments of the present disclosure, all other embodiments acquired by those of ordinary skill in the art under the precondition that no creative efforts have been made shall be covered by the protective scope of the present disclosure.

Other aspects, features, and advantages of this disclosure will become apparent from the following detailed description when taken in conjunction with the accompanying drawings.

FIG. 1 is a block diagram of a data processing system based on instant messaging or social applications according to embodiments of the present disclosure. For example, the data processing system may be a messaging system that provides a messaging service to users in a social network. Referring to FIG. 1, the data processing system includes a data processing server 101, and one or more clients 102 connecting with the data processing server 101 via network.

Figure 2:
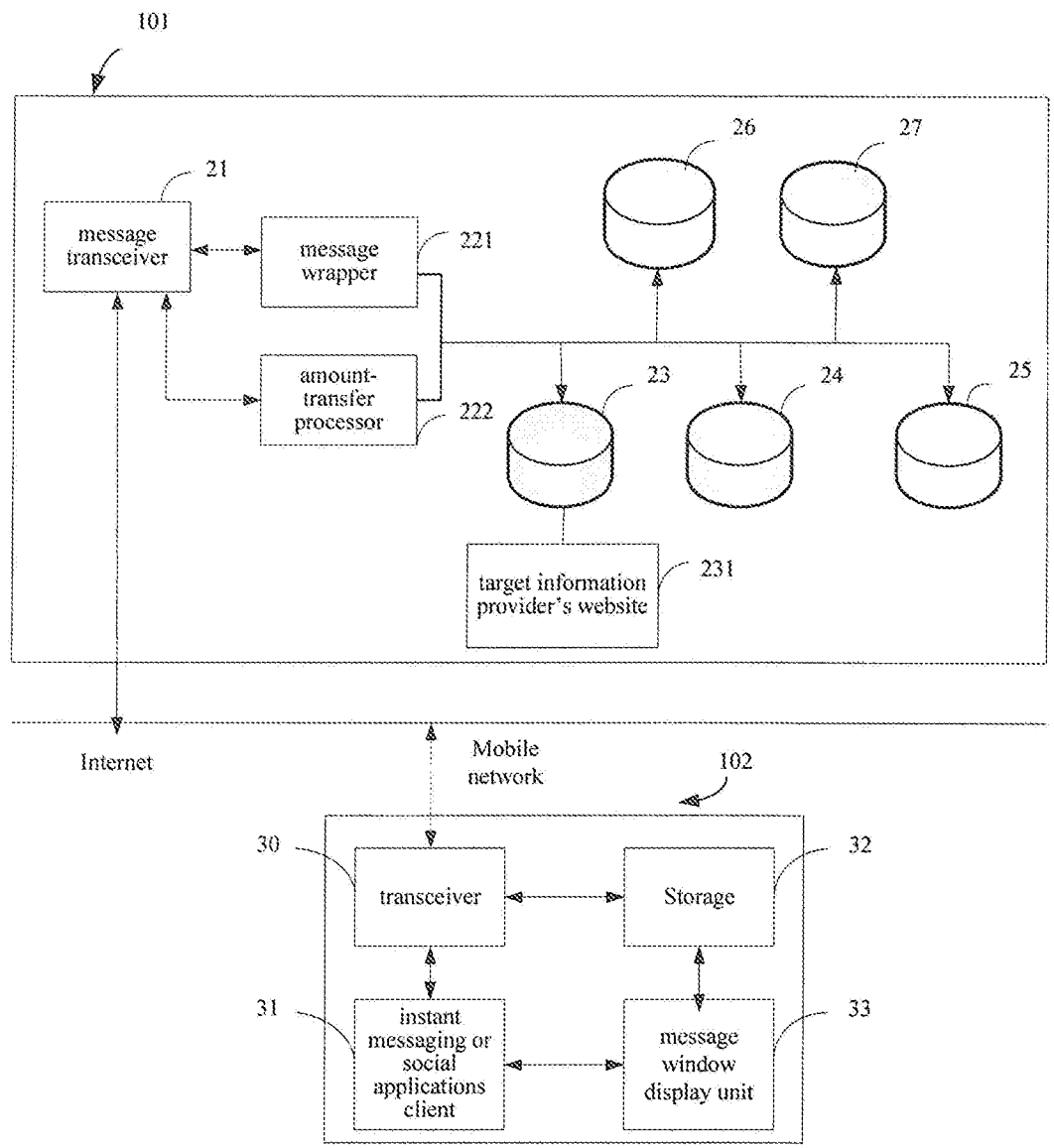
FIG. 2 is a block diagram of the data processing system according to embodiments of the present disclosure.

FIG. 2 is a block diagram of the data processing system according to embodiments of the present disclosure. Referring to FIG. 2, the data processing server 101 includes a user identification database 24 for maintaining registration system of the data processing server 101, and a user relation-chain database 26 for maintaining relationship among the user identifications.

The data processing server 101 further includes an account information database 25 for storing multiple account information. To ensure the data transferring, the data processing server 101 further includes a relationship database 27 between user identification and account information which stores one-to-one relationship or one-to-many relationship between user identification and account information.

The data processing server 101 further includes a target information database 23 which is configured to provide target information such as target link information, or target description information, etc. Concretely, the target information database 23 can connect with a target information provider's website 231 by which the target information database 23 can be managed. The target may include products or services for sale in an online market place.

Furthermore, to perform the message handover, the data processing server 101 further includes a message wrapper 221 which is configured to wrap and encapsulate the message according to the target information provided by the target information database 23 and the account number provided by the account information database 25, and sending it to the client 102 via a message transceiver 21. Of course, the data processing server 101 may further include an amount-transfer processor 222 for performing the amount-transfer, which may carry out the transfer according to a message or a request received by the message transceiver 21.

On the other hand, the client 102 includes a transceiver 30, an instant messaging or social applications client 31, a storage 32 and message window display unit 33. Concretely, the transceiver 30 is configured to receive and send message. The instant messaging or social applications client 31 is configured to communicate messages with the data processing server 101 and display the interactive message on the message window display unit 33.

Figure 3:
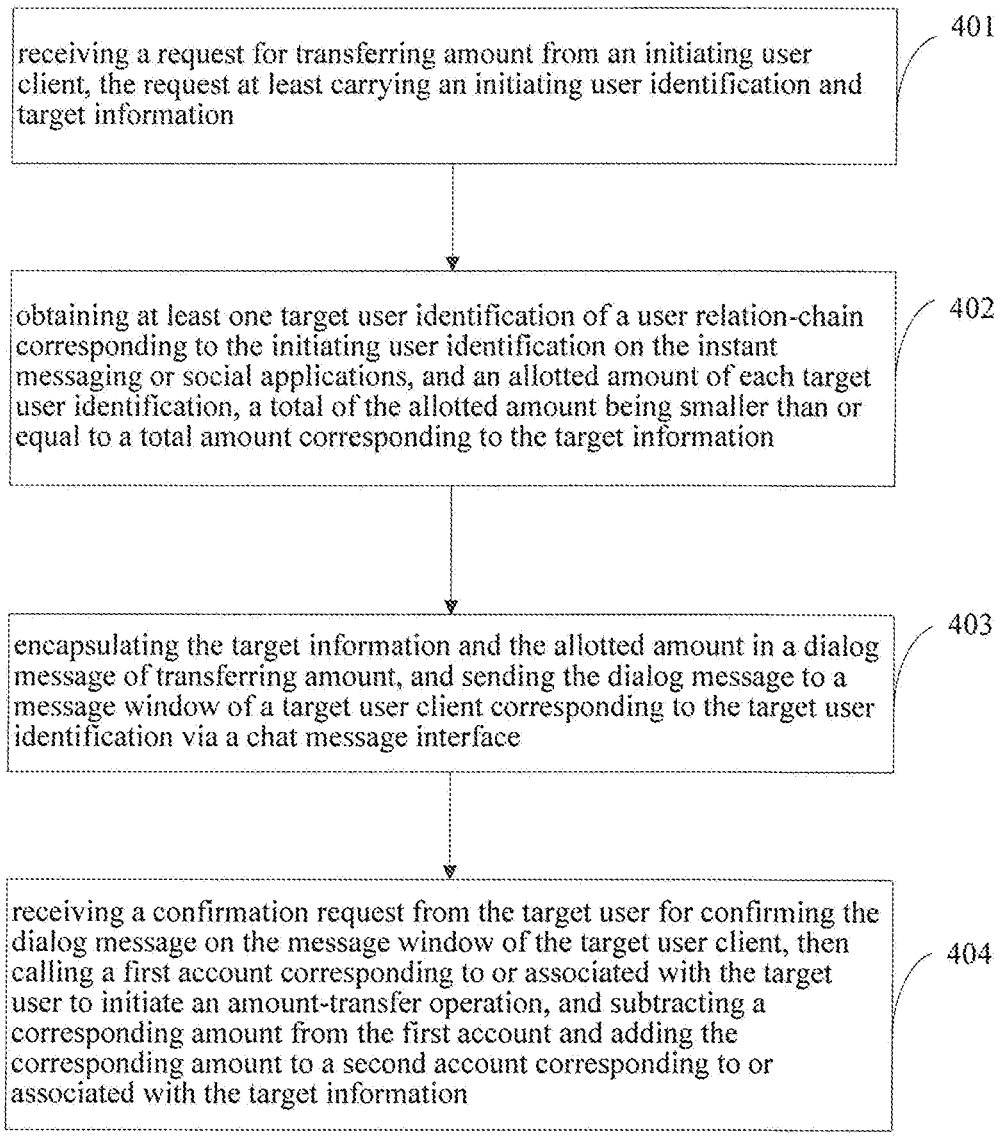
FIG. 3 is a flowchart of a data processing method based on instant messaging or social applications according to embodiments of the present disclosure.

FIG. 3 is a flowchart of a data processing method based on instant messaging or social applications according to embodiments of the present disclosure. As illustrated, the method includes the follow steps:

401, receiving a request for transferring amount from an initiating user client, the request at least carrying an initiating user identification and target information;

402, obtaining at least one target user identification of a user relation-chain corresponding to the initiating user identification on the instant messaging or social applications, and an allotted amount of each target user identification, a total of the allotted amount being smaller than or equal to a total amount corresponding to the target information;

403, encapsulating the target information and the allotted amount in a dialog message of transferring amount, and sending the dialog message to a message window of a target user client corresponding to the target user identification via a chat message interface;

404, receiving a confirmation request from the target user for confirming the dialog message on the message window of the target user client, then calling a first account corresponding to or associated with the target user to initiate an amount-transfer operation, and subtracting a corresponding amount from the first account and adding the corresponding amount to a second account corresponding to or associated with the target information.

The method of the present embodiment performs the amount-transfer operation for the target information based on instant messaging client or social applications. Since the message in the instant messaging or social applications are difficult to be juggled, which avoids security vulnerability when using URL transferring, thereby improving security of the amount-transfer operation and improving security of the user's account finally.

Optional embodiments can be obtained by any combination of the embodiments mentioned above, which are not described one by one.

Figure 4:
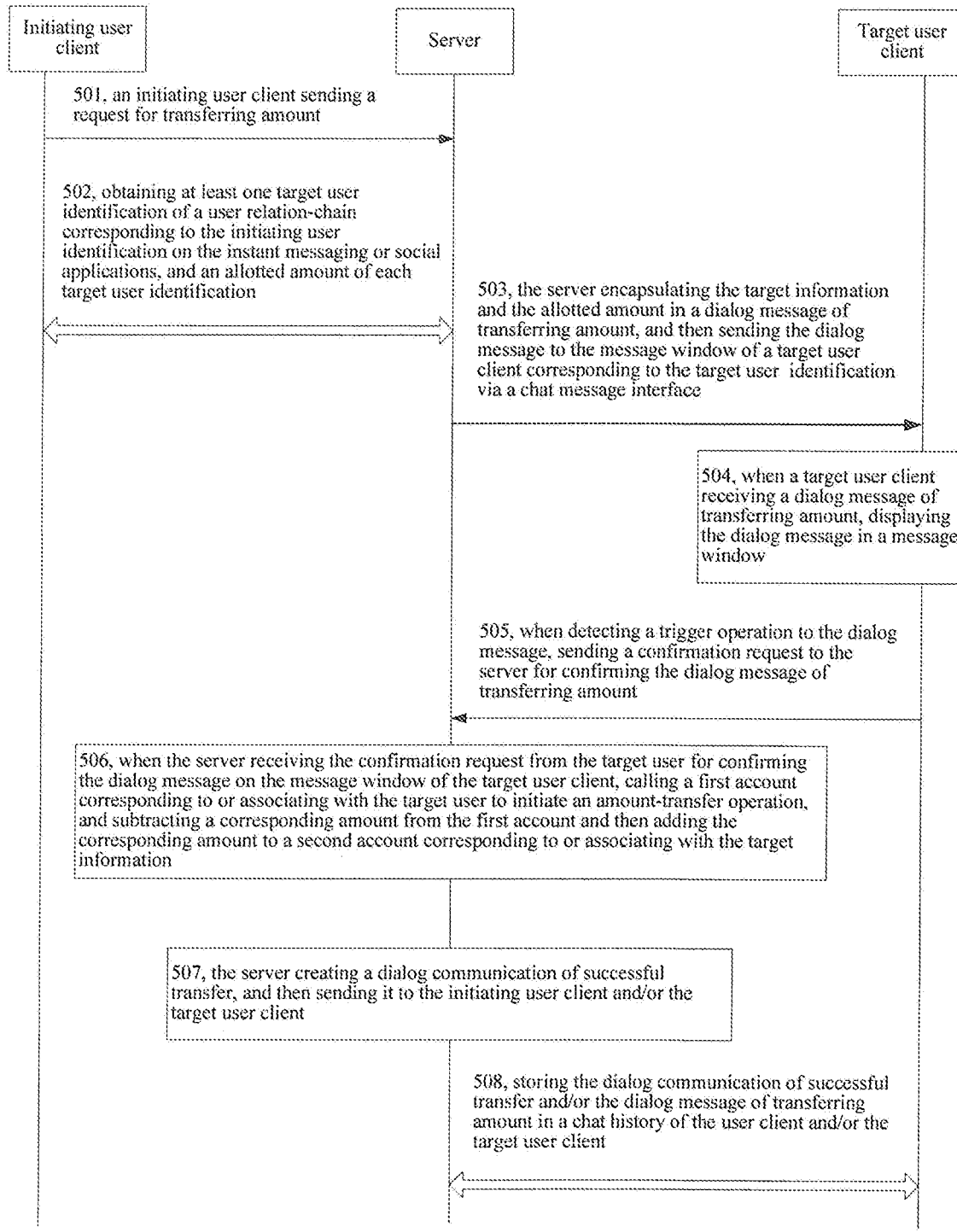
FIG. 4 is a flowchart of a data processing system based on instant messaging or social applications according to embodiments of the present disclosure.

FIG. 4 is a flowchart of a data processing system based on instant messaging or social applications according to another embodiment of the present disclosure. As illustrated, the method may include the following steps and additional steps.

In step 501, an initiating user client sending a request for transferring amount, and the request at least carrying an initiating user identification and target information.

In this embodiment, the initiating user client means the client where a user initiating a money transfer process is located. For the initiating user client, after the initiating user selects a target in this client, the initiating user client will send a target identification to the server, and the server will built target information according to the target identification, which will then be sent to the initiating user client, so that the initiating user client can obtain it. When the initiating user wishes other users to transfer amount and pay money for him, he may trigger an amount-transfer operation via an amount-transfer option provided by the client. When the amount-transfer option is detected to be activated, the initiating user client sends a request for transferring amount to the server, and therein at least the initiating user identification and target information are carried by the request.

Of course, besides the total amount corresponding to the target, the target information may further include the name of the target and/or its description information. Furthermore, the target information can identify with only one target or a target set composed of multiple targets.

For example, when the user selects a toy on a page provided by the instant messaging client and wants to buy it, the instant message client will send the identification of the toy, a link information of the page to the server, and then the server builds target information including a total amount (namely the money value) according to the identification and the link information, and then returns the target information to the instant messaging client, so that the instant messaging client can obtained it to initiate a payment process.

In step 502, when the server receiving the request, obtaining at least one target user identification of a user relation-chain corresponding to the initiating user identification on the instant messaging or social applications, and an allotted amount of each target user identification, a total of the allotted amount being smaller than or equal to a total amount corresponding to the target information.

In order to make multiple users to perform the amount-transfer operation for the target information, the method may further include obtaining at least one target user identification of a user relation-chain corresponding to the initiating user identification on the instant messaging or social applications, for example, multiple instant messaging contacts or social networking service (SNS) community contacts of a certain user.

Concretely, when receiving the request, the server provides the user relation-chain of the initiating user identification to the initiating user client, so that the initiating user client can choose an executing user from the user relation-chain to perform the payment process. For example, the initiating user client switches the current page to a contactbook so as to show contacts of the initiating user.

In this embodiment, the user relation-chain is provided by server, of course, it can be provided by initiating user client in an actual scene. Since the user relation-chain will be obtained when the initiating user clients are started, thus it will be obtained from cache of the client, instead of being provided again by the server during the initiating user client running, so that the user identifications included in the user relation-chain can be selected by the initiating user. Concretely, each user identification selected by the client will become a target user identification, thus at least one target user identification will be obtained when the initiating user client performs at least one selection process.

In this embodiment, the target user identification is determined by selecting one of user identifications which are shown to the user. However, the process of obtaining the target user identification on the user relation-chain also can be a searching process. Concretely, a searching entry is provided on the page of transferring amount, through which the initiating user can enter user identifications. When the user identification is obtained via the searching entry, the initiating user client will search the user relation-chain for this identification, if the identification is searched out, then it will become the target user identification.

Or, the amount-transfer process is not limited to the user identifications on the user relation-chain, instead, when the initiating user client obtains the user identification via the searching entry, then this identification will be searched in a user identification pool, if this identification is searched out, then it will become the target user identification.

In the step 502, the process of obtaining allotted amount for each target user identification includes, but not limits to obtaining a total amount corresponding to the target information, and evenly allotting at least a part of the total amount to each target user which is then served as the allotted amount corresponding to each target user identification, or dividing at least a part of the total amount into multiple allotted amounts corresponding to each target user identification according to an allotting command from the initiating user client.

Concretely, the allotted amount for each target user identification may be the same. For example, if multiple contacts are selected via the contact-book, so the total amount will be allotted evenly according to the number of the contacts, that is, if the total amount is 100, and the number of the contacts is 4, then the allotted amount for each person is 25.

Optionally, the allotted amount for each target user identification may also be determined by an allotting command from the initiating user. For example, if multiple contacts are selected via the contact-book, and the allotted amounts for each contact has been set, then the total amount will be split into several parts accordingly. For example, the total amount is 100 dollars, the number of the contacts is 2, and the allotted amount of the contact A is 25 dollars and the allotted amount for the contact B is 75 dollars.

It should be noted that, the process of obtaining the allotted amount for each target user identification may be carried out by providing an allotted amount setting interface, so as to allow the initiating user to set the allotted amount. For the situation of allotting evenly, however, this setting process may be omitted. When the target user identifications are obtained, the total amount will be allotted evenly according to the number of the target user identification, in this time, each allotted amount is the same.

In some cases, the amount of money to be paid by the target users may be determined according to the actual demand of the initiating user, which can be a part of the total amount corresponding to the target information. For example, the total amount corresponding to the target information is 100 dollars, and the initiating user wishes the target users to pay 50 dollars, and another 50 dollars are paid by himself. Therefore in this time, the amount of money to be paid by the target users is only a part of the total amount, namely 50 dollars.

In this step, multiple target users are requested to pay for one initiating user, actually, only one target user can be requested by one initiating user in other embodiments however. Please note that, in such one-to-one scene, process of allotting the amount is unnecessary.

In step 503, the server encapsulating the target information and the allotted amount in a dialog message of transferring amount, and then sending the dialog message to the message window of a target user client corresponding to the target user identification via a chat message interface.

Concretely, the target information includes a website link corresponding to the target. Accordingly, the encapsulation process includes extracting key information corresponding to the website link, and encapsulating the key information and the allotted amount in a dialog message of transferring amount.

The dialog message may include several preset message templates which are applicable to different scenes. In the present embodiments, the total amount and the initiating user identifications can be filled in the present message templates, so that the user who receives the dialog message can distinguish if the initiating user is one of acquaintances or check if the total amount is correct, according to the current message content.

Of course, the message content in the dialog message may include total amount, commodity name of the target and the initiating user identifications, etc., which are provided to allow the user who receives the dialog message can confirm the payment.

The dialog message may be a guide for the mount-transfer process. Concretely, when the user receives the dialog message of transferring amount, the interface will turn to the actual target page based on a skipping target of the dialog message, so as to browse the detail of the target.

Additionally, it should be noted that, the dialog message may further include an amount-transfer interface, which is configured to subtract a corresponding amount from the account of the target user and then add the subtracted amount to a second account.

In step 504, when a target user client receiving a dialog message of transferring amount, displaying the dialog message in a message window, and the dialog message including target information and an allotted amount for a target user in a total amount corresponding to the target information.

The target user will receive the dialog message in a form of one instant message or one social application message. Security of the target user is ensured due to the dialog message is private.

Of course, for the situation of multiple target users, since every target user needs to transfer its allotted amount for the target information, thus every dialog message can carry allotted amount of the target user when multiple target user identification are determined, so that every target user could only perform a process of transferring a part of total amount, which prevents a misoperation of the target user to cause a wrong payment, thereby enhancing the security of the user account.

When the target user client receives the dialog message, this dialog message may be displayed as a prompting message, of course, it also may be displayed in a dialog interface.

In step 505, when detecting a trigger operation to the dialog message, sending a confirmation request to the server for confirming the dialog message of transferring amount.

This trigger operation is carried out on the message window, which may be a clicking operation to the dialog message. During the trigger operation, client interface information may be provided to ensure a seamless handover, so that the amount-transfer process could be performed in the current client according to the client interface information, instead of switching to other application clients.

In addition, as page turning is based on the same client, thus a repeat login because the page is turned to other clients could be omitted. Since the current client is under a logging-in status, thus this logging-in status can be transferred in different functions of the same account number, which reduces a complex operation thereby achieving a smooth page turning.

As the dialog message is displayed in a form of instant message, when the target user clicks the dialog message to pay for the initiating user, the amount-transfer process may be triggered in the client through an interface determined by the client interface information. If the target user does not wish to transfer amount for the initiating user, this transferring process could be ignored or refused.

It should be noted that, other processes for transferring money in the target client are the same, which are not repeated here.

During opening the target information, it is unnecessary to repeat login since the target user has fogged in the target user client. Instead, the amount-transfer process can be continued according to the logged user information and the preset information related to the amount-transfer process, such as account information, bank card information, etc., which simplifies the processing flow.

Of course, to further improve the security, the method further includes obtaining a user identification and a password entered by the target user, after a trigger command which is triggered by the target user on the message window is received by the target user client, and then performing the amount-transfer operation by logging an account corresponding to the user identification and the password. In such a way, the user identification and the password are added, thus its' ensured that the user using the target user client right is the target user, thereby preventing payment with the stealing account.

In step 506, when the server receiving the confirmation request from the target user for confirming the dialog message on the message window of the target user client, calling a first account corresponding to or associated with the target user to initiate an amount-transfer operation, and subtracting a corresponding amount from the first account and then adding the corresponding amount to a second account corresponding to or associated with the target information.

Concretely, the target information may include second account number information of the target provider. The server may obtain a second account corresponding to or associated with the target information can be obtained accordingly. When the server receives the request for transferring amount from the initiating user client, an object account namely the account of the target provider is necessary whatever which user performs the transfer, for ensuring the debit can be performed successfully, thus this second account must to be determined.

In this embodiment, the amount-transfer process is initiated for the target information, but the amount-transfer process may be achieved by firstly creating an amount-transfer interface for considering the initiating user identification as a debit object, then modifying this interface according to the request of transferring amount, so that the debit object could not be restricted by this interface.

In step 507, the server creating a dialog communication of successful transfer, and then sending it to the initiating user client and/or the target user client.

The server can determine if the transfer has been finished by the target user by communicating with the object server of transferring amount. If the transfer is finished, the object server of transferring amount will send a confirmation message to the server, so as to inform the server.

When the server confirms any transfer of the allotted amount for any target user has been finished, a dialog communication of successful transfer will be built according to the allotted amount corresponding to the target user, which includes target information and allotted amount etc. And the dialog communication of successful transfer may be stored in the server, or sent to the initiating user client and/or target user client.

In step 508, storing the dialog communication of successful transfer and/or the dialog message of transferring amount in a chat history of the user client and/or the target user client.

After the dialog communication of successful transfer is received by the initiating user client, it will be stored in the chat history of the current terminal. When the successful transfer dialog message is received by the target user client, it will be stored in the chat history of the current terminal. Optionally, the dialog communication of successful transfer also can be stored in the chat history of both the initiating user client and the target user client, for convenient to be review. The review can be performed according to key word searching, or user identification searching, and the like, which are not described here.

Further, the server can present an actual completion percentage which illustrates the progress of the amount-transfer process for multiple target users.

Regarding the situation of multiple target user, since the transfer time for every target user may be different, thus it's necessary to confirm the actual completion percentage of the amount-transfer process for each target user, so that the progress of the amount-transfer process (for example if the allotted amount of the target user has been transferred) become more apparent to the initiating user. For example, under a situation that each target user identification is allotted with an average allotted amount, and the number of the target users is 4. If all target users fail to do the transfer, the actual completion percentage of the amount-transfer process is 0, whose identification can be "not started" or "unpaid"; if any one target user has finished his transfer for his corresponding allotted amount, the actual completion percentage of the amount-transfer process is 25%, whose identification can be "ongoing" and the like; if all target users have finished their amount-transfers, the actual completion percentage of the amount-transfer process is 100%, whose identification can be "completed". Of course, if all target users refuse the amount-transfer or no target user finishes his transfer in a preset time, this actual completion percentage of the amount-transfer process also is 0, whose identification can be "invalid". This embodiment is merely described for explaining the actual completion percentage of the amount-transfer process, but the presentation forms or identifications of the actual completion percentage are not limited here.

The method of the present embodiment performs the amount-transfer operation for the target information based on instant messaging client or social applications. Since the message in the instant messaging or social applications are difficult to be juggled, which avoids security vulnerability when using URL transferring, thereby improving security of the amount-transfer operation and improving security of the user's account finally. Furthermore, the target information will not be presented in the payment account by message handover. After the trading, this instant message may be stored in the chat history of both sides, which is convenient for reviewing and searching.

FIG. 5 is a schematic view of a data processing device based on instant messaging or social applications according to embodiments of the present disclosure. As illustrated, the device includes a processor and a non-transitory storage medium accessible to the processor. The non-transitory storage medium include the following modules:

a receiving module 601, configured to receive a request for transferring amount from an initiating user client, the request at least carrying an initiating user identification and target information;

an obtaining module 602, configured to obtain at least one target user identification of a user relation-chain corresponding to the initiating user identification on the instant messaging or social applications, and an allotted amount of each target user identification. A total of the allotted amount is smaller than or equal to a total amount corresponding to the target information;

an encapsulation module 603, configured to encapsulate the target information and the allotted amount in a dialog message of transferring amount, and send the dialog message to a message window of a target user client corresponding to the target user identification via a chat message interface; and an amount-transfer module 604, configured to receive a confirmation request from the target user for confirming the dialog message on the message window of the target user client, then identify a first account corresponding to or associated with the target user to initiate an amount-transfer operation, and subtract a corresponding amount from the first account and adding the corresponding amount to a second account corresponding to or associated with the target information.

Optionally, the target information includes a website link corresponding to the target, accordingly, the encapsulation module is configured to extract key information corresponding to the website link, and then encapsulate the key information and the allotted amount in a dialog message of transferring amount.

Optionally, the target information comprises second account number information of a target provider.

Optionally, the obtaining module is configured to obtain a total amount corresponding to the target information, and evenly allot at least a part of the total amount to each target user which is then served as the allotted amount corresponding to each target user identification, or divide at least a part of the total amount into multiple allotted amounts corresponding to each target user identification according to an allotting command from the user client.

Optionally, the amount-transfer module is further configured to receive a trigger command which is triggered by the target user on the message window, obtain a user identification and a password entered by the target user, and then log in an account corresponding to the user identification and the password to perform the amount-transfer operation.

Optionally, the device further includes a creation module configured to create a dialog communication of successful transfer and then send it to the initiating user client and/or the target user client.

Optionally, the dialog communication of successful transfer and/or the dialog message of transferring amount are stored in a chat history of the user client and/or the target user client.

Optional embodiments can be obtained by any combination of the embodiments mentioned above, which are not described one by one.

It should be noted that, the embodiment mentioned above merely describes an example for dividing the data processing device into several functional modules, but in the practical application, different functional modules can be distributed to perform the functions mentioned above, that is, the interior structure of the device can be divided into several functional modules to perform the partial or whole functions. In addition, the data processing device and the method thereof pertain to the same concept, whose process could be reviewed in the embodiments related to the method, thus is not repeated here.

FIG. 6 is a flowchart of a data processing method based on instant messaging or social applications according to embodiments of the present disclosure. Referring to FIG. 6, the method includes the following steps:

In step 701, when a target user client receiving a dialog message of transferring amount, the target user client displays the dialog message in a message window, where the dialog message including target information and an allotted amount for a target user in a total amount corresponding to the target information; and In step 702, when detecting a trigger operation to the dialog message, the target user client sends a confirmation to a server. For example, the confirmation may cause the server to identify a first account corresponding to or associated with the target user and a second account corresponding to the target information and subtract a corresponding amount equal to the allotted amount from the first account and then adding the corresponding amount to the second account.

Optionally, the method may further include obtaining a user identification and a password entered by the target user, and logging in an account corresponding to the user identification and the password to initiate an amount-transfer operation.

Optionally, the method may further include receiving a dialog communication of successful transfer which is created when an amount-transfer operation is succeeded.

Optionally, the method may further include storing the dialog communication of successful transfer and/or the dialog message of transferring amount in a chat history of the target user client.

Figure 7:
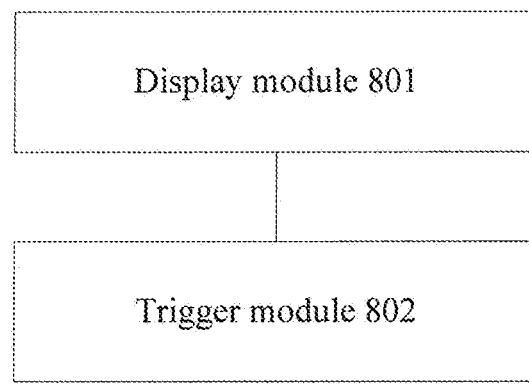
FIG. 7 is a schematic view of a data processing device based on instant messaging or social applications according to embodiments of the present disclosure.

FIG. 7 is a schematic view of a data processing device based on instant messaging or social applications according to another embodiment of the present disclosure. The device may be a target user client that includes a processor and a non-transitory storage medium accessible to the processor. The non-transitory storage medium include the following modules:

a display module 801, configured to receive a dialog message of transferring amount, display the dialog message in a message window, and the dialog message including target information and an allotted amount for a target user in a total amount corresponding to the target information; and a trigger module 802, configured to detect a trigger operation to the dialog message and send a confirmation to a server causing the server subtracts a corresponding amount equal to the allotted amount from a first account corresponding to the target user and then adding the corresponding amount to a second account corresponding to the target information.

Optionally, the device further includes an amount-transfer module, arranged for obtaining a user identification and a password entered by the target user, and logging in an account corresponding to the user identification and the password to initiate an amount-transfer operation.

Optionally, the device further includes a receiving module, arranged for receiving a dialog communication of successful transfer which is created when an amount-transfer operation is succeeded.

Optionally, the device further includes a storage module, arranged for storing the dialog communication of successful transfer and/or the dialog message of transferring amount in a chat history of the target user client.

It's understood for person skilled in the art to accomplish part of or whole steps in the embodiment mentioned above by hardware or by instructing the related hardware with program. Such program can be stored in a computer-readable storage medium such as read-only memory, magnetic or optical disk, etc.

While the disclosure has been described in connection with what are presently considered to be the most practical and preferred embodiments, it is to be understood that the disclosure is not to be limited to the disclosed embodiments, but on the contrary, is intended to cover various modifications and equivalent arrangements included within the spirit and scope of the disclosure.

What is claimed is:

1. A data processing method performed by an instant messaging server system, the server system providing an instant messaging application to a plurality of users, the method comprising:
   receiving, by the instant messaging server system from an initiating client device associated with an initiating user of the instant messaging application, a request for transferring an amount to purchase a target object, the request comprising an identification of the initiating user, information of the target object, and a total cost of the target object;
   obtaining, by the instant messaging server system, identification of at least one target user based on a user relation chain corresponding to the identification of the initiating user on the social networking application and an allotted amount of the at least one target user identification based on the received request, wherein the allotted amount is smaller than or equal to the total cost of the target object;
   based on the obtained identification, encapsulating, by the instant messaging server system, the information of the target object and the allotted amount in a dialog message of the instant messaging application;
   sending, by the instant messaging server system via the instant messaging application, the dialog message to a message window of at least one target user client corresponding to the at least one target user; and
   receiving, by the instant messaging server system, a confirmation request from the at least one target user for confirming the dialog message on the message window of the target user client;
   identifying a respective account corresponding to with the at least one target user to initiate an amount-transfer operation;
   subtracting a corresponding amount from the respective account; and
   adding the corresponding amount to a second account corresponding to the target object.

2. The method according to claim 1, wherein the information of the target object comprises a website link corresponding to the target object; and
   wherein encapsulating the information of the target object and the allotted amount in the dialog message of the instant messaging application comprises: extracting key information corresponding to the website link, and then encapsulating the key information and the allotted amount in the dialog message.

3. The method according to claim 1, wherein the information of the target object comprises account number information of a provider of the target object.

4. The method according to claim 1, wherein the at least one target user includes a plurality of target users, the method further comprising:
   evenly allotting the total cost of the target object to each of the plurality of target users, or dividing at least a part of the total cost of the target object into multiple allotted amounts corresponding to each of the plurality of target users according to an allotting command from the initiating client device.

5. The method according to claim 1, wherein receiving the confirmation request from the at least one target user comprises:
   receiving a trigger command which is triggered by the at least one target user on the message window;
   obtaining a user identification and a password entered by the at least one target user; and
   logging in an account corresponding to the user identification and the password to perform the amount-transfer operation.

6. The method according to claim 1, further comprising:
   creating a dialog communication of successful transfer, and then sending it to at least one of: the initiating client device and the at the least one target user client.

7. The method according to claim 6, further comprising: storing at least one of the following in a chat history: the dialog communication of successful transfer and the dialog message of transferring amount.

8. An instant messaging server system, comprising:
   one or more processors; and
   memory storing one or more program modules, the one or more program modules including an instant messaging application for use by a plurality of users, which, when executed by the one or more processors, cause the instant messaging server system to perform operations comprising:
   receiving, by the instant messaging server system from an initiating client device associated with an initiating user of the instant messaging application, a request for transferring an amount to purchase a target object, the request comprising an identification of the initiating user, information of the target object, and a total cost of the target object;
   obtaining, by the instant messaging system, identification of at least one target user based on a user relation chain corresponding to the identification of the initiating user on the social networking application and an allotted amount of the at least one target user identification based on the received request, wherein the allotted amount is smaller than or equal to the total cost of the target object;
   based on the obtained identification, encapsulating, by the instant messaging system, the information of the target object and the allotted amount in a dialog message of the instant messaging application;

sending, by the instant messaging system via the instant messaging application, the dialog message to a message window of at least one target user client corresponding to the at least one target user; and receiving, by the instant messaging system, a confirmation request from the at least one target user for confirming the dialog message on the message window of the target user client;

identifying a respective account corresponding to with the at least one target user to initiate an amount-transfer operation;

subtracting a corresponding amount from the respective account; and adding the corresponding amount to a second account corresponding to the target object.

9. The server system according to claim 8, wherein the information of the target object includes a website link corresponding to the target object; and wherein encapsulating the information of the target object and the allotted amount in the dialog message of the instant messaging application comprises: extracting key information corresponding to the website link, and encapsulating the key information and the allotted amount in the dialog message.

10. The server system according to claim 8, wherein the information of the target object comprises account number information of a provider of the target object.

11. The server system according to claim 8, wherein the at least one target user includes a plurality of target users, the operations further comprising:

evenly allotting the total cost of the target object to each of the plurality of target users or dividing at least a part of the total cost of the target object into multiple allotted amounts corresponding to each of the plurality of target users according to an allotting command from the initiating client device.

12. The server system according to claim 8, wherein receiving the confirmation request from the at least one target user comprises:

receiving a trigger command which is triggered by the at least one target user on the message window;

obtaining a user identification and a password entered by the at least one target user; and logging in an account corresponding to the user identification and the password to perform the amount-transfer operation.

13. The server system according to claim 8, the operations further comprising:

creating a dialog communication of successful transfer, and then sending it to at least one of: the initiating client device and the at the least one target user client.

14. The server system according to claim 13, the operations further comprising: storing at least one of the following in a chat history: the dialog communication of successful transfer and the dialog message of transferring amount.

* * * * *